United States Patent [19]

Fahey et al.

[11] 4,224,478
[45] Sep. 23, 1980

[54] DATA TRANSMISSION CIRCUIT FOR ESTABLISHING A BIDIRECTIONAL DATA PATH IN A TELEPHONE SYSTEM

[75] Inventors: Robert J. Fahey, Burlington; Martin L. Resnick, Chestnut Hill, both of Mass.

[73] Assignees: GTE Sylvania Incorporated, Stamford, Conn.; GTE Laboratories Incorporated, Waltham, Mass.

[21] Appl. No.: 965,808

[22] Filed: Dec. 4, 1978

[51] Int. Cl.² ............................................. H04M 3/22
[52] U.S. Cl. ............................ 179/18 FA; 179/2 DP; 179/18 AB
[58] Field of Search ........... 179/18 AB, 18 FA, 18 F, 179/175.2 C, 2 AM, 2 A, 2 DP, 2 R

[56] References Cited

U.S. PATENT DOCUMENTS

| | | | |
|---|---|---|---|
| 3,205,312 | 9/1965 | Brightman et al. | 179/18 F |
| 3,564,143 | 2/1971 | Stewart, Jr. | 179/2 A |
| 3,855,421 | 12/1974 | Pilling et al. | 179/18 FA |
| 3,858,008 | 12/1974 | Remec | 179/18 AB |
| 4,059,727 | 11/1977 | Kingswell et al. | 179/2 AM |

FOREIGN PATENT DOCUMENTS 1179603 10/1964 Fed. Rep. of Germany ..... 179/18 AB

*Primary Examiner*—Thomas W. Brown
*Attorney, Agent, or Firm*—Peter Xiarhos

[57] ABSTRACT

A data transmission circuit for use in a telephone system. The telephone system includes a telephone line connected with tip and ring terminals and a subscriber telephone coupled across the tip and ring terminals. The on/hook condition of the telephone is determined by a telephone status monitor circuit which periodically examines the voltage across the tip and ring terminals and produces an output signal when the telephone is in an on/hook condition. Following this output signal, and when data is to be transmitted between a first terminal of the data transmission circuit and the tip and ring terminals, a continuous dc loop is established between the tip and ring terminals and, after a dialtone period, the loop is made and broken in accordance with dialing pulses representing a telephone number of the location to be called. At the termination of the dialing operation, the dc loop is maintained and an ac path is established between the first terminal and the tip and ring terminals for the transmission of data between the first terminal and the tip and ring terminals.

15 Claims, 6 Drawing Figures

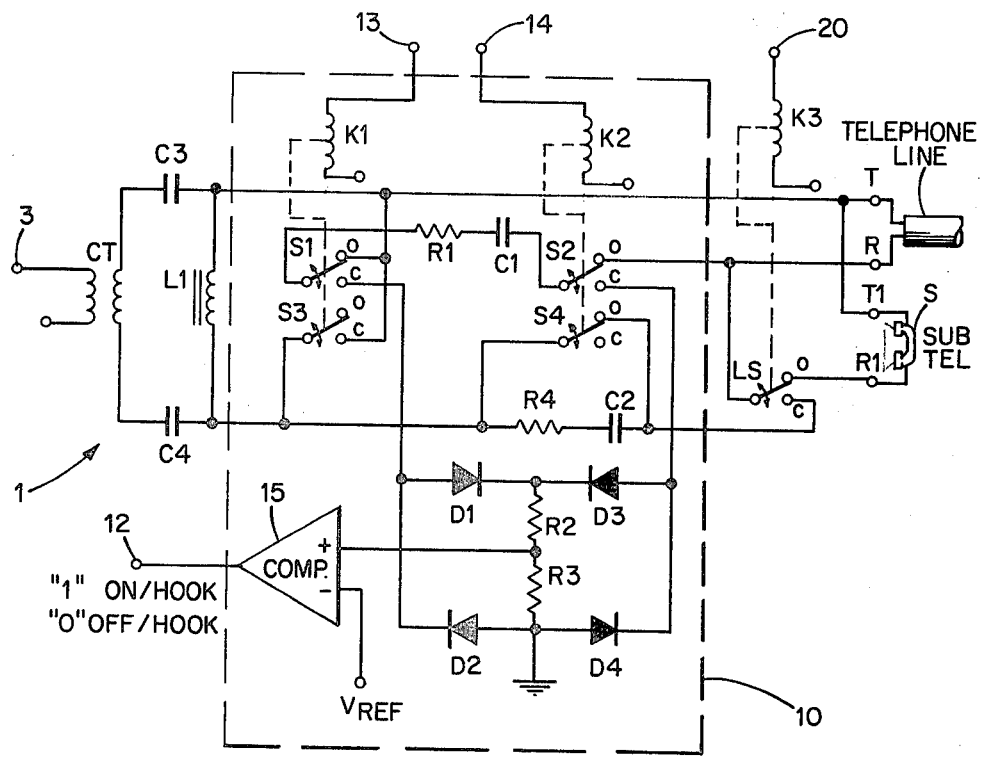
Fig. 1.
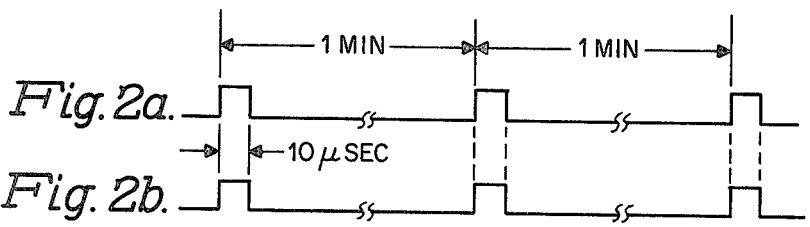
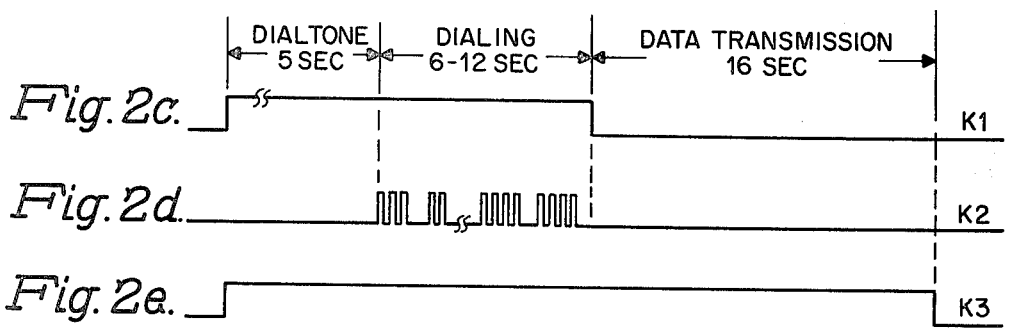

DATA TRANSMISSION CIRCUIT FOR ESTABLISHING A BIDIRECTIONAL DATA PATH IN A TELEPHONE SYSTEM

CROSS-REFERENCE TO RELATED APPLICATION

In co-pending patent application Ser. No. 965,809, filed concurrently herewith in the name of Robert J. Fahey, entitled TELEPHONE STATUS MONITOR CIRCUIT, and assigned to GTE Sylvania Incorporated, there is disclosed and claimed a telephone status monitor circuit representing a variation of the telephone status monitor circuit disclosed in the present application.

BACKGROUND OF THE INVENTION

The present invention relates to a data transmission circuit and, more particularly, to a telephone data transmission circuit for establishing a data path for the bi-directional transmission of data between first and second locations over a standard telephone line.

There are many applications in which it is desirable to transmit data bi-directionally between a first location and a second location over a standard telephone line which is also used or shared by a telephone subscriber for making and receiving normal telephone calls. By way of example, the data at the first location may originate with a local data processing unit such as a microprocessor and be transmitted over the telephone line to associated remote apparatus at the second location. Data from the second location may also be transmitted over the telephone line to be used as desired by the data processing unit at the first location. In order to perform the above data transmission operations, especially since a subscriber may also use the same telephone line for making and receiving normal telephone calls, it is necessary that the telephone not be in use, that is, that the telephone be in an on/hook condition. It is necessary, therefore, that the on/hook condition of the telephone be first determined prior to any communication of data between the local and remote locations. However, in detecting the on/hook condition, it is generally desirable, in order to comply with government regulations relating to the connection of equipment to telephone networks, that the equipment used to detect the on/hook condition be isolated in some fashion from the telephone line. The present invention is directed to a data transmission circuit employing a simple, low-cost telephone status monitor circuit capable of satisfying the above-mentioned isolation requirements while also providing indications of on/hook conditions of a telephone for utilization by the data transmission circuit in establising bi-directional communication between local and remote locations.

BRIEF SUMMARY OF THE INVENTION

In accordance with the present invention a data transmission circuit is provided for establishing a data transmission path between a first terminal and tip and ring terminals of a telephone system. The telephone system includes a telephone line connected with the tip and ring terminals and to the telephone. The tip and ring terminals have a voltage thereacross of a value corresponding to the on/hook condition or off/hook condition of the telephone.

The data transmission circuit in accordance with the invention includes a status monitor circuit means. The status monitor circuit means operates to examine on a frequent basis the voltage across the tip and ring terminals and to produce an output signal when the voltage across the tip and ring terminals has a value corresponding to an on/hook condition of the telephone. A first circuit means is adapted when data is to be transmitted between the first terminal and the tip and ring terminals and following an output signal representative of an on/hook condition being produced by the status monitor circuit means to uncouple the telephone from across the tip and ring terminals to the telephone line and to thereafter make and break the dc loop in accordance with a predetermined telephone number. A second circuit means operates upon termination of the making and breaking of the continuous dc loop by the first circuit means to maintain the continuous loop between the tip and ring terminals. A third circuit means operates after the making and breaking of the continuous dc loop to establish an ac data path between the first terminal and the tip and ring terminals for the transmission of data between the first terminal and the tip and ring terminals.

BRIEF DESCRIPTION OF THE DRAWING

Various objects, features and advantages of a data transmission circuit in accordance with the invention will be apparent from the following description taken in conjunction with the accompanying drawing in which:

FIG. 1 is a schematic diagram of a data transmission circuit in accordance with the invention; and FIGS. 2(a)–2(e) are waveforms of control signals employed by the data transmission circuit in accordance with the invention.

DETAILED DESCRIPTION OF THE INVENTION

Referring now to FIG. 1, there is shown a schematic diagram of a data transmission circuit 1 in accordance with the present invention. The data transmission circuit 1 is arranged in accordance with the invention to establish a data transmission path between a first terminal 3 and a pair of terminals T and R for allowing the bi-directional transmission of data between these terminals. The terminal 3 may be connected with any suitable data source, for example, a microprocessor or other data processing unit, and the terminals T and R, representing standard tip and ring terminals, are connected with a standard telephone line. The telephone line in turn is connected in a standard fashion to a telephone central office (not shown). When no data transmission is to take place between the terminals 3 and T, R, a local subscriber is able to make and receive telephone calls over the telephone line via a standard telephone S connected across a pair of subscriber terminals T1 and R1. When a subscriber is able to make and receive calls, the telephone S is connected across the tip and ring terminals T, R and, thus, across the telephone line, by means of a switch LS connected in series with the terminals R and R1 as shown in FIG. 1.

Before any transmission of data between the terminals 3 and T, R can occur, in either direction, it is generally desirable that the subscriber's telephone S not be in use, that is, that the telephone S be in an on/hook condition and disconnected from across the terminals T, R and the telephone line. This on/hook condition of the telephone S is detected by a telephone status monitor circuit 10. The telephone status monitor circuit 10, to be described in detail hereinafter, operates to examine the voltages across the tip and ring terminals T, R and, depending on whether the voltage across the terminals T, R at the time of examination has a value corresponding to an on/hook condition or to an off/hook condition, to produce a corresponding first or second output signal at an output terminal 12 thereof. More particularly, if the voltage across the tip and ring terminals T, R at the time of examination has a value corresponding to an on/hook condition, typically between 40 and 56 volts d.c., a first output signal, specifically, a binary "1" output signal, is produced at the output terminal 12 representative of the on/hook condition. If the voltage across the tip and ring terminals T, R at the time of examination has a value corresponding to an off/hook condition, typically less than 20 volts d.c., a second output signal, specifically, a binary "0" output signal, is produced at the output terminal 12 representative of the off/hook condition. The output signals produced at the output terminal 12 are applied to any suitable apparatus, for example, the aforementioned microprocessor coupled to the terminal 3. These signals may be examined by the microprocessor and when any one of these signals has the binary "1" on/hook value the data transmission circuit 1 may be enabled by the microprocessor to allow data to be transmitted between the terminal 3 and the tip and ring terminals T, R for application to the telephone line and transmission to a remote location. Suitable apparatus, for example, a computer or other data processing apparatus, may be provided at the remote location for processing the data originating from the microprocessor and also for initiating its own data transmission in response to the data transmission from the microprocessor. The abovementioned binary "1" and "0" signals produced by the status monitor circuit 10 may also be used by the microprocessor as an indication of use of the telephone S, specifically, by detecting transitions between the "1" and "0" signals.

The examination by the status monitor circuit 10 of the voltage across the tip and the ring terminals T, R occurs on a frequent, and preferably periodic, basis, for example, once per minute. This frequent examination is required since at any given time a subscriber may be using the telephone S for making and receiving regular calls. Before any data transmission can take place, the conclusion or termination of any call being made or received by a subscriber must first be detected. The examination or sampling of the voltages across the tip and ring terminals T, R occurs until the termination of the call has been detected. At this time, a binary "1" on/hook output signal is produced at the output terminal 12 of the telephone status monitor circuit 10 and applied to the microprocessor as mentioned hereinabove.

The operation of the status monitor circuit 10 will now be described in greater detail. As mentioned above, the status monitor circuit 10 examines or samples the voltages across the tip and ring terminals T, R on a frequent basis, for example, the aforementioned rate of once per minute. This sampling operation is under the control of a series of spaced pulses (e.g., of 10 microseconds width) applied to each of a pair of control terminals 13 and 14 of the status monitor circuit 10. These pulses, which may be derived from the microprocessor, have a typical form as shown in FIGS. 2(a) and 2(b) and are applied, respectively, to a first relay K1 and a second relay K2. The relays K1 and K2 are caused to be energized by these pulses as a result of which switches S1 and S2 associated with the relays K1 and K2 are caused alternately to switch between first (de-engergized) and second (energized) positions. The first and second positions of the switches S1 and S2 are indicated in FIG. 1 by the designations "o" and "c", respectively.

When the switches S1 and S2 are in their first (de-energized) positions as shown in FIG. 1, the voltage then present across the tip and ring terminals T, R is applied via the switches S1 and S2 across a series combination of a current-limiting resistance R1 and a sampling capacitance C1. This voltage serves to charge the capacitance C1 to the existing line voltage value, specifically, to either a value of 40–56 volts for an on/hook condition or to a value of less than 20 volts for an off-/hook condition. At such time as the relays K1 and K2 are energized, specifically, during the positive pulses of the pulse trains as shown in FIGS. 2(a) and 2(b), the switches S1 and S2 are actuated to their second positions as a result of which the resistance R1 and the capacitance C1 are uncoupled from across the tip and ring terminals T, R. The uncoupling action does not interfere in any manner with the subscriber's use of the telephone.

The voltage established across the capacitance C1 as discussed above is applied to and examined by circuitry including four diodes D1–D4, a pair of resistances R2 and R3 connected in series between the junctures of the diodes D1, D3 and D2, D4 and ground potential, and a comparator 15 coupled between the juncture of the resistances R2 and R3 and the output terminal 12. The diodes D1 and D4 are provided and required for the specific situation in which the voltage at the tip terminal T is positive relative to the ring terminal R and, similarly, the diodes D2 and D3 are provided and required for the alternative situation in which the voltage at the tip terminal T is negative relative to the ring terminal R. The resistances R2 and R3 are employed as a voltage-divider circuit.

Assuming that the voltage at the tip terminal T is positive relative to the ring terminal R, the voltage across the capacitance C1 at the time of the above-described uncoupling action establishes a current path which extends from the capacitance C1, through the switch S2 in its second position, the diode D4, the resistances R3 and R2, the diode D1, the switch S1 in its second position, and the resistance R1 back to the capacitance C1. If the voltage at the tip terminal T is negative relative to the ring terminal R, the voltage across the capacitance C1 at the time of the uncoupling action establishes a current path which extends from the capacitance C1, through the resistance R1, the switch S1 in its second position, the diode D2, the resistances R3 and R2, the diode D3, and the switch S2 in its second position, back to the capacitance C1.

As current flows through the resistances R2 and R3 in either of the two abovedescribed situations, a voltage is developed across the resistance R3 which, in a common voltage divider fashion, is equal to $R3/R2+R3$ times the voltage across both of the resistances R2 and R3. The voltage across R3 is always positive with respect to ground and is compared in the comparator 15 with a reference voltage $V_{REF}$. If the value of the voltage across the resistance R3 is greater than the value of the reference voltage $V_{REF}$, a binary "1" output signal is produced at the output terminal 12 of the comparator 15 indicating an on/hook condition of the telephone S. If the value of the voltage across the resistance R3 is less than the value of the reference voltage $V_{REF}$, a binary "0" output signal is produced at the output terminal 12 of the comparator 15 indicating an off/hook condition of the telephone S.

As previously mentioned once an on/hook condition has been detected by the status monitor circuit 10, that is, a binary "1" output signal has been produced by the comparator 15, it is possible to initiate a data transmission sequence between the terminal 3 and the tip and ring terminals T, R. The manner in which this data transmission sequence takes place is as follows. After a binary "1" output signal is produced by the comparator 15 and it is desired to transmit data from the terminal 3 to the tip and ring terminals T, R for transmission over the telephone line to a remote location, the pulse trains applied to the control terminals 13 and 14 are discontinued and control signals such as shown in FIGS. 2(c) and 2(e) are applied, respectively, to the control terminal 13 and a third control terminal 20. The signal applied to the control terminal 13 causes the relay K1 to be energized and the switch S1 and another similar switch S3 to be actuated from their first positions to their second positions. The signal applied to the control terminal 20 causes a relay K3 to be energized and the aforementioned switch LS to be actuated from its first position to its second position.

The actuation of the switch S1 from its first position to its second position serves to disconnect or uncouple the resistance R1 and the capacitance C1 from across the tip and ring terminals T, R, and the actuation of the switches S3 and LS from their first positions to their second positions serves to establish a continuous dc loop between the tip and ring terminals T, R. This loop extends from the tip terminal T, through the switch S3 in its second position, a switch S4 in its first position (as shown in FIG. 1), and the switch LS in its second position, back to the ring terminal R. The actuation of the switch LS from its first position to its second position also serves to disconnect or uncouple the telephone S from across the tip and ring terminals T, R. In this latter instance, a subscriber attempting to use the telephone S will be met only with silence, that is, the subscriber will not even get a dial tone, thereby informing the subscriber that a data transmission sequence is in process and that he or she should wait a short period, for example a minute or so, before initiating the call.

Upon the establishment of the dc loop between the tip and ring terminals T, R as discussed above, a standard dial tone is received from the telephone central office over the telephone line and applied to the dc loop. This dial tone, which occurs within a predetermined period, for example, within five seconds of the energization of the relay K1 (FIG. 2c), is part of a normal telephoning sequence. However, in the present invention this dial tone is effectively ignored by the system. After the abovementioned five second dial tone period, and for a period of about 6–12 seconds thereafter, dialing pulses such as shown in FIG. 2(d) are applied to the control terminal 14. These dialing pulses correspond to a particular telephone number of the remote location which is to receive the data to be applied to the terminal 3 (e.g., by the microprocessor). The dialing pulses, which are typically at a rate of 10 pulses/sec, cause the relay K2 to be energized and de-energized at the dialing pulse rate and the associated switch S4, which is in series with the aforedescribed dc loop to the central office, to be actuated between its first and second positions at the dialing pulse rate. The switch S2 is actuated in the same manner as the switch S4 but does not have any effect on a data transmission sequence. The actuation of the switch S4 at the dialing pulse rate serves to make and break the aforedescribed dc loop to the central office at the dialing pulse rate so that the central office can ascertain the telephone number being dialed and make the necessary connections to the remote location. Any arcing of the switches S2 and S4 during operation of the relay K2 is minimized by a resistance R4 and a capacitance C2 connected in parallel with the switch S4 in its first position.

After the dialing operation has been concluded, the dialing pulses (FIG. 2(c)) applied to the control terminal 14 and the control signal (FIG. 2(a)) applied to the control terminal 13 are discontinued thereby causing the relays K1 and K2 to return to their de-energized states and the switches S1–S4 to return to their first positions as shown in FIG. 1. At this time, data may be applied to the terminal 3 (e.g., by the microprocessor) for application to the tip and ring terminals T, R and subsequent transmission over the telephone line to the remote location specified by the aforedescribed dialing operation.

The data applied to the terminal 3 is coupled via a coupling transformer CT and a pair of coupling capacitances C3 and C4 to the tip and ring terminals T, R, the capacitance C3 being coupled directly to the tip terminal T and the capacitance C4 being coupled to the ring terminal R via the switch S4 in its first position and the switch LS in its second position. Since the removal of the control signal (FIG. 2(c)) from the control terminal 13 and the consequential de-energization of the relay K1 causes the dc loop to the central office to be broken, a choke L1 which acts as a short circuit to dc and a high impedance to ac is connected across the tip and ring terminals T, R (with the switch S4 in its first position and the switch LS in its second position) and serves to maintain the dc loop to the central office upon the de-energization of the relay K1. Thus, the data at the terminal 3 is able to pass to the tip and ring terminals T, R and to be applied over the telephone line to the central office and, ultimately, to the remote location. The data transmission between the terminal 3 and the tip and ring terminals T, R may be followed, if desired, by a corresponding data transmission from apparatus at the remote location. This data is able to pass from the telephone line to the tip and ring terminals T, R and from the tip and ring terminals T, R back to the terminal 3 using the same ac data path as used in the passage of data in the forward direction from the terminal 3 to the tip and ring terminals T, R. A suitable total transmission time for the bidirectional transmission of data as discussed above is about 16 seconds, as indicated in FIGS. 2(c)–2(e). At the end of this 16 second period, the control signal applied to the control terminal 20 (FIG. 2(e)) is removed, causing the relay K3 to be de-energized and the switch LS to return to its first position. At this time, the subscriber is once again able to use the telephone S for normal telephone calls.

Some suitable values of components for the data transmission circuit 1 corresponding to the signals discussed hereinabove are as follows:

| | |
|---|---|
| C1 | 0.10 microfarads |
| C2 | 0.33 microfarads |
| C3 | 0.47 microfarads |
| C4 | 0.47 microfarads |
| R1 | 1.8 kilohms |
| R2 | 100 kilohms |

| | -continued | |
|---|---|---|
| R3 | 10 kilohms | |
| R4 | 100 ohms | |
| D1-D4 | RD1343 | |
| L1 | 2 henry, 180 ohms | |
| CT | 1:1 ratio, 600 ohms | |
| V$_{REF}$ | 2.5 volts | |

While there has been described what is considered to be a preferred embodiment of the invention it will be apparent to those skilled in the art that various changes and modifications may be made therein without departing from the invention as called for in the appended claims.

We claim:

1. A data transmission circuit for establishing a data transmission path between a first terminal and tip and ring terminals of a telephone system, said telephone system including a telephone line connected with the tip and ring terminals and a telephone coupled across the tip and ring terminals and to the telephone line, said tip and ring terminals having a voltage thereacross of a value corresponding to the on/hook condition or off/hook condition of the telephone, said data transmission circuit comprising:

status monitor circuit means operative to examine on a frequent basis the voltage across the tip and ring terminals and to produce an output signal when the voltage across the tip and ring terminals has a value corresponding to an on/hook condition of the telephone;

first circuit means adapted when data is to be transmitted between the first terminal and the tip and ring terminals and following an output signal representative of an on/hook condition being produced by the status monitor circuit means to uncouple the telephone from across the tip and ring terminals and to establish a continuous dc loop between the tip and ring terminals to the telephone line and to thereafter make and break the dc loop in accordance with a predetermined telephone number;

second circuit means operative upon termination of the making and breaking of the continuous dc loop by the first circuit means to maintain the continuous dc loop between the tip and ring terminals; and third circuit means operative after the making and breaking of the continous dc loop to establish an ac data path between the first terminal and the tip and ring terminals for the transmission of data between the first terminal and the tip and ring terminals.

2. A data transmission circuit in accordance with claim 1 wherein the status monitor circuit means comprises:

first and second control terminals each adapted to receive a series of pulses;

first and second control means coupled, respectively, to the first and second control terminals and operative in response to the series of pulses at the first and second control terminals to be actuated between first and second operating states in accordance with said pulses;

charging circuit means arranged when the first and second control means are in their first operating states to be placed by the first and second control means in circuit with the tip and ring terminals and when the first and second control means are in their second operating states to be removed by the first and second control means out of circuit with the tip and ring terminals;

said charging circuit means being operative when coupled in circuit with the tip and ring terminals by the first and second control means to be charged to the value of the voltage then present across the tip and ring terminals; and status circuit means arranged when the first and second control means are in their second operating states to be connected by the first and second control means in circuit with the charging circuit means, said status circuit means being operative when connected with the charging circuit means to examine the value of voltage to which the changing circuit means has been charged and, when the value of the charged voltage corresponds to an on/hook condition of the telephone, to produce an output signal.

3. A data transmission circuit in accordance with claim 2 wherein:

the first and second control means comprise:

first and second relay means coupled, respectively, to the first and second control terminals and operative to be controlled between first and second energization states by the pulses at the first and second control terminals; and first and second monitor switch means associated, respectively, with the first and second relay means and operative in response to the first and second relay means being controlled between their first and second energization states to switch between corresponding first and second positions;

said charging circuit means being arranged when the first and second monitor switch means are in their first positions to be placed, together with the first and second monitor switch means, in a series path with the tip and ring terminals and across the tip and ring terminals, and further arranged when the first and second monitor switch means are in their second positions to be removed from the series path to the tip and ring terminals and from across the tip and ring terminals.

4. A data transmission circuit in accordance with claim 3 wherein the status circuit means comprises:

circuit means adapted when the first and second monitor switch means are in their second positions to be coupled across the charging circuit means, said circuit means being operative to derive a signal from the voltage to which the charging circuit means has been charged and to compare the value of this derived signal with a reference signal and to produce an output signal when the value of the derived signal bears a predetermined relationship to the value of the reference signal representative of an on/hook condition of the telephone.

5. A data transmission circuit in accordance with claim 4 wherein:

the charging circuit means includes a capacitance element.

6. A data transmission circuit in accordance with claim 4 wherein:

the charging circuit means includes a series combination of a capacitance element and a resistance element.

7. A data transmission circuit in accordance with claim 1 wherein the first circuit means comprises:

a first control terminal adapted to receive a first control signal of a first duration;

a second control terminal adapted to receive dialing signals representative of a predetermined telephone number, said dialing signals being received at the second control terminal during the time of the first control signal and subsequent to the initiation of the first control signal at the first control terminal;

a third control terminal adapted to receive a control signal concurrently with the first control signal received at the first control terminal;

first, second and third control means, coupled, respectively, to the first, second and third control terminals;

said first, second and third control means being operative in response to the control signals received at the first and third control terminals, respectively, and prior to the dialing signals being received at the second control terminal, to establish a continuous dc loop between the tip and ring terminals, and said third control means being further operative in response to the control signal received at the third terminal to uncouple the telephone from across the tip and ring terminals; and said second control means being further operative in response to dialing signals received at the second control terminal to make and break the aforesaid continuous dc loop in accordance with the telephone number represented by the dialing signals.

8. A data transmission circuit in accordance with claim 7 wherein:

the first, second and third control means comprise:
first, second and third relay means coupled, respectively, to the first, second and third control terminals and operative to be controlled between first and second energization states by the respective signals received at the first, second and third control terminals; and
first, second and third loop switch means associated, respectively, with the first, second and third relay means and operative in response to the first, second and third relay means being controlled between their first and second energization states to switch between corresponding first and second positions, said first and third loop switch means being operative when in their second positions and said second loop switch means is in its first position to establish a continuous dc loop via the first, second and third loop switch means between the tip and ring terminals, said third loop switch means being further operative when in its second position to uncouple the telephone from across the tip and ring terminals, and said second loop switch means being operative when switched between its first and second positions due to the dialing signals at the second control terminal to respectively break and make the aforesaid continuous dc loop.

9. A data transmission circuit in accordance with claim 8 wherein:

the control signal received at the third control terminal extends for a time beyond the duration of the first control signal at the first control terminal and beyond the duration of the dialing signals at the second control terminal;

said first and second loop switch means being operative in response to the termination of the respective signals at the first and second control terminals to switch to their first positions and said third loop switch means being maintained in its second position in response to the control signal at the third control terminal;

and wherein the second circuit means comprises:
inductive choke means operative when the first and second loop switch means are in their first positions and the third loop switch means is in its second position to maintain a continuous dc loop between the tip and ring terminals via the inductive choke means, the second loop switch means in its first position and the third loop switch means in its second position.

10. A data transmission circuit for establishing a data transmission path between a first terminal and tip and ring terminals of a telephone system, said telephone system including a telephone line connected with the tip and ring terminals and a telephone coupled across the tip and ring terminals and to the telephone line, said tip and ring terminals having a voltage thereacross of a value corresponding to the on/hook condition or off-/hook condition of the telephone, said data transmission circuit comprising:

first and second control terminals each adapted to receive a series of pulses;

first and second relay means coupled, respectively, to the first and second control terminals and operative to be controlled between first and second energization states in accordance with the pulses at the first and second control terminals;

first and second monitor switch means associated, respectively, with the first and second relay means and operative in response to the first and second relay means being controlled between their first and second energization states to switch between corresponding first and second positions;

charging circuit means arranged when the first and second monitor switch means are in their first positions to be placed by the first and second monitor switch means in circuit with the tip and ring terminals and when the first and second monitor switch means are in their second positions to be removed by the first and second monitor switch means out of circuit with the tip and ring terminals;

said charging circuit means being operative when coupled in circuit with the tip and ring terminals by the first and second monitor switch means to be charged to the value of the voltage then present across the tip and ring terminals;

status circuit means arranged when the first and second monitor switch means are in their second positions to be connected by the first and second monitor switch means in circuit with the charging circuit means, said status circuit means being operative when connected with the charging circuit means to examine the value of voltage to which the charging circuit means has been charged and, when the value of the charged voltage corresponds to an on/hook condition of the telephone, to produce an output signal;

said first and second terminals being further adapted when data is to be transmitted between the first terminal and the tip and ring terminals and following an output signal being produced by the status circuit means to receive, respectively, a control signal of a first duration and dialing signals representative of a predetermined telephone number, said dialing signals being received at the second control terminal during the time of the control signal at the first terminal and subsequent to the initiation of said control signal;

a third control terminal adapted to receive a control signal concurrently with the aforesaid control signal received at the first control terminal;

third relay means coupled to the third control terminal and having first and second energization states;

said first, second and third relay means being operative in response to the signals at the respective control terminals to be controlled between their first and second energization states; and first, second and third loop switch means associated, respectively, with the first, second and third relay means and operative in response to the first, second and third relay means switching between their first and second energization states to switch between corresponding first and second positions, said first and third loop switch means being operative when in their second positions and said second loop switch means is in its first position to establish a continuous dc loop via the first, second and third loop switch means between the tip and ring terminals, said third loop switch means being further operative when in its second position to uncouple the telephone from across the tip and ring terminals, and said second loop switch means being operative when switched between its first and second positions due to the dialing signals at the second control terminal to respectively break and make the aforesaid continuous dc loop.

11. A data transmission circuit in accordance with claim 10 wherein:

the control signal received at the third control terminal extends for a time beyond the duration of the control signal at the first control terminal and beyond the duration of the dialing signals at the second control terminal;

said first and second loop switch means being operative in response to the termination of the respective signals at the first and second control terminals to operate in their first positions and said third loop switch means being maintained in its second position in response to the control signal at the third control terminal;

and wherein the second circuit means comprises:

inductive choke means operative when the first and second loop switch means are in their first positions and the third loop switch means is in its second position to maintain a continuous dc loop between the tip and ring terminals via the inductive choke means, the second loop switch means in its first position and the third loop switch means in its second position.

12. A data transmission circuit in accordance with claim 11 wherein:

the charging circuit means is arranged when the first and second monitor switch means are in their first positions to be placed, together with the first and second monitor switch means, in a series path with the tip and ring terminals and across the tip and ring terminals, and further arranged when the first and second monitor switch means are in their second positions to be removed from the series path to the tip and ring terminals and from across the tip and ring terminals.

13. A data transmission circuit in accordance with claim 12 wherein the status circuit means comprises:

circuit means arranged when the first and second monitor switch means are in their second positions to be coupled across the charging circuit means, said circuit means being operative to derive a signal from the voltage to which the charging circuit means has been charged and to compare the value of this derived signal with a reference signal and to produce an output signal when the value of the derived signal bears a predetermined relationship to the value of the reference signal representative of an on/hook condition of the telephone.

14. A data transmission circuit in accordance with claim 13 wherein:

the charging circuit means includes a capacitance element.

15. A data transmission circuit in accordance with claim 14 wherein:

the charging circuit means includes a series combination of a capacitance element and a resistance element.

* * * * *